United States Patent [19]
Crisman et al.

[11] Patent Number: 5,622,210
[45] Date of Patent: Apr. 22, 1997

[54] FLEXIBLE HOSE WITH COMPOSITE CORE

[75] Inventors: Chuck Crisman, Carson City; Russell Chudd, Reno; Philip A. Mulvey, Carson City, all of Nev.

[73] Assignee: LSP Products Group, Inc., Carson City, Nev.

[21] Appl. No.: 490,024

[22] Filed: Jun. 12, 1995

[51] Int. Cl.[6] .................................................. F16L 11/04
[52] U.S. Cl. ......................... 138/104; 138/137; 138/123; 138/125; 138/127; 138/140
[58] Field of Search ..................... 138/104, 137, 138/123–126, 109, 36, 140, 141, DIG. 3

[56] References Cited

U.S. PATENT DOCUMENTS

| | | | |
|---|---|---|---|
| 3,604,461 | 9/1971 | Matthews | 138/125 X |
| 3,948,293 | 4/1976 | Bixby | 138/126 |
| 3,977,440 | 8/1976 | Phillippi | 138/125 |
| 3,994,673 | 11/1976 | Bixby | 431/344 |
| 4,159,027 | 6/1979 | Caillet | 138/127 |
| 4,330,017 | 5/1982 | Satoh et al. | 138/126 |
| 4,384,595 | 5/1983 | Washkewicz et al. | 138/125 X |
| 4,627,844 | 12/1986 | Schmitt | 138/137 X |
| 4,724,178 | 2/1988 | Hyodo et al. | 138/98 X |
| 4,735,083 | 4/1988 | Tenenbaum | 138/36 X |
| 4,791,965 | 12/1988 | Wynn | 138/146 |
| 4,881,576 | 11/1989 | Kitami et al. | 138/125 |
| 4,905,736 | 3/1990 | Kitami et al. | 138/109 X |
| 4,942,906 | 7/1990 | Igarashi et al. | 138/126 |
| 5,024,419 | 6/1991 | Mulvey | 251/148 |
| 5,076,329 | 12/1991 | Brunnhofer | 138/137 |
| 5,167,259 | 12/1992 | Brunnhofer | 138/137 |
| 5,170,011 | 12/1992 | Martucci | 138/137 X |
| 5,182,954 | 2/1993 | Menheere | 138/104 X |
| 5,219,002 | 6/1993 | Stenger et al. | 138/118.1 |
| 5,232,645 | 8/1993 | Ramos, Jr. | 138/125 X |
| 5,264,262 | 11/1993 | Igarashi | 138/137 X |
| 5,332,160 | 7/1994 | Ruskin | 138/137 X |
| 5,348,779 | 9/1994 | Igarashi | 428/36.7 |
| 5,349,988 | 9/1994 | Walsh et al. | 138/107 |
| 5,356,681 | 10/1994 | Ichikawa et al. | 138/137 |
| 5,362,530 | 11/1994 | Kitami et al. | 138/126 X |
| 5,383,087 | 1/1995 | Noone et al. | 138/137 X |
| 5,384,184 | 1/1995 | Noone et al. | 138/121 |
| 5,419,374 | 5/1995 | Nawrot et al. | 138/137 |
| 5,507,320 | 4/1996 | Plumley | 138/123 X |

OTHER PUBLICATIONS

Fluidmaster Product Brochures dated Sep. 1983 through Mar. 1992.
Versa Fit Product Brochure dated Aug. 1992.

Primary Examiner—David Scherbel
Assistant Examiner—Patrick F. Brinson
Attorney, Agent, or Firm—Gardere & Wynne, L.L.P.

[57] ABSTRACT

A flexible hose comprising a composite polymeric core with a degradation-resistant liner and a thermoplastic elastomeric liner coating, the core preferably being surrounded by a protective sheath. The degradation-resistant liner is optionally a polyolefin or fluorine-containing polyolefin and can have a convoluted inside surface. The composite core can optionally include a vapor barrier and leak indicator, and a tracer can be provided to indicate twisting of the sheath.

26 Claims, 2 Drawing Sheets

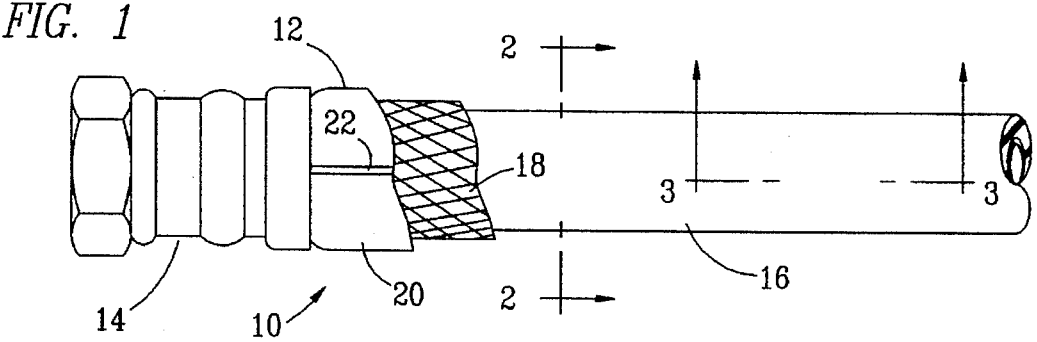
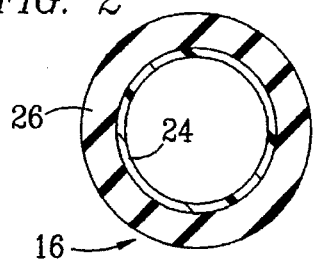
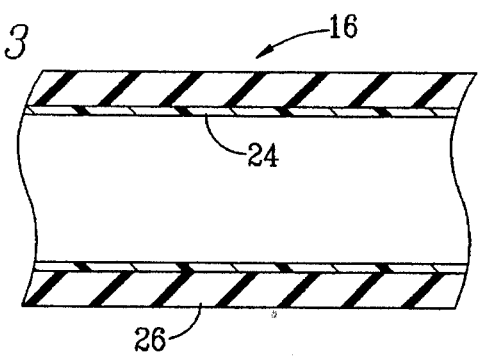
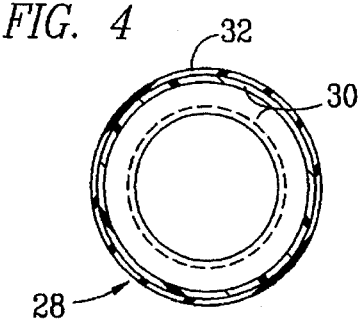
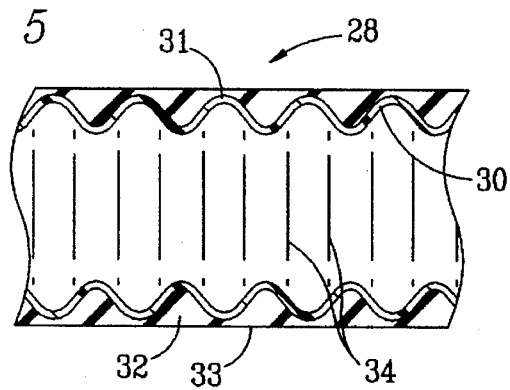
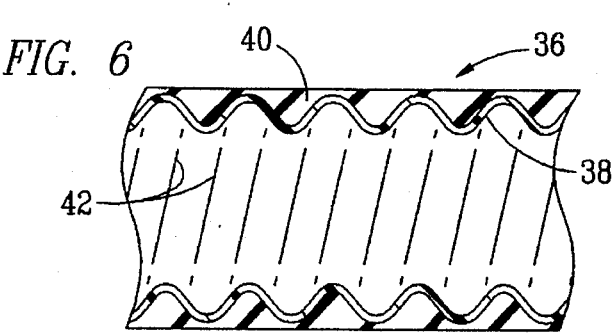

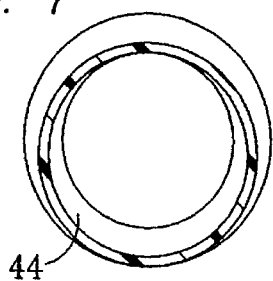
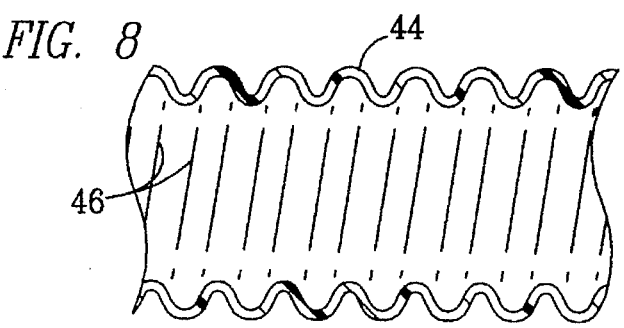
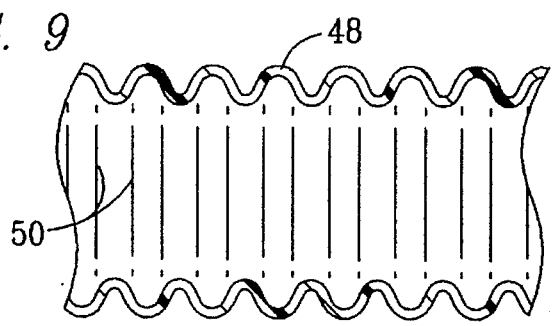
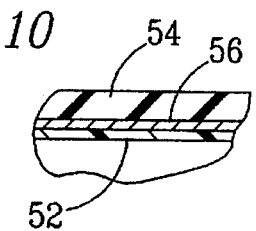
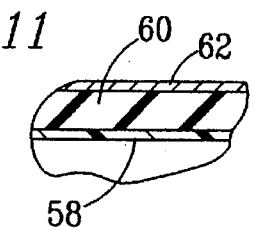
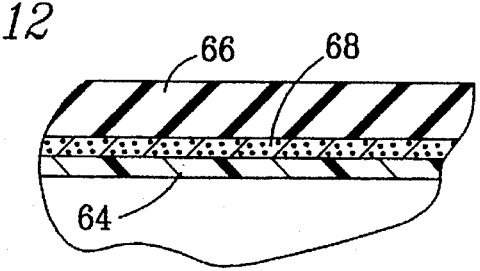

FLEXIBLE HOSE WITH COMPOSITE CORE

BACKGROUND OF THE INVENTION

1. Field of the Invention

This invention relates to water hoses for home and industrial use, and more particularly, to improved flexible hoses for connecting a potable water source to sanitary appliances such as faucets, toilet tanks, dishwashers, water heaters and clothes washing machines.

2. Description of Related Art

Flexible hoses useful for connecting hot and cold potable water sources to sanitary appliances are well known, such hoses being disclosed for example in U.S. Pat. Nos. 4,159,027 and 5,024,419, and other patents cited therein. U.S. Pat. Nos. 4,159,027 and 5,024,419 disclose hoses having a tubular core made of supple elastomeric material and an outer protective sheath formed of braided metallic wire. The core is preferably made of an elastomeric resin containing from 20 to 30 percent ethylene propylene copolymer, from 20 to 40 percent paraffin oil, and from 40 to 60 percent carbon black.

Flexible hoses having tubular cores made of an elastomeric material suitable for use in other industrial applications are also previously known. U.S. Pat. Nos. 3,948,293 and 3,994,673 disclose hoses having a rubber-modified polyolefin core, preferably polyethylene and butyl rubber, for LP gas installations.

U.S. Pat. Nos. 4,881,576 and 4,905,736 disclose hoses having a polyamide core, preferably nylon, for refrigerant or fuel oil service.

U.S. Pat. No. 4,942,906 discloses rubber hoses useful as automotive fuel lines and having an inner core formed from a blend of acrylic rubber and a fluorine-containing resin such as polyvinyl fluoride (PVF), polyvinylidene fluoride (PVDF), polytetrafluoroethylene (PTFE), tetrafiuoroethylene-hexafiuoroethylene copolymer (FEP), and ethylene-tetrafluoroethylene copolymer (ETF).

U.S. Pat Nos. 5,264,262 and 5,348,779 disclose refrigerant hoses with an inner core consisting of a blend of modified polyolefin and polyamide resin, and one to ten percent caprolactam, preferably with an inside sealing layer of a chlorinated elastomer such as chlorinated polyethylene or chlorosulphonated polyethylene having magnesium oxide or lead oxide dispersed therein to protect the resin layer of the hose against deterioration.

U.S. Pat No. 5,349,988 discloses refrigerant hoses having a corrugated inner tube preferably formed of a polyamide material such as nylon.

Although flexible hoses having an extruded rubber core, usually ethylene propylene diamine (EPDM) rubber, inside a braided metal sheath are well known in the flexible hose connector industry, the commercially available hoses do not have composite inner cores and are not resistant to chloramine attack. During sustained use of such hoses, particularly on the hot water side, rubber particles slough off of the hose liner into the water. This degradation of the hose liner dirties the water supply, clogs filters and strainers, and eventually causes water leaks through the hose wall.

SUMMARY OF THE INVENTION

The composite hose disclosed herein is specifically designed to resist attack and degradation from chlorine and chloramine compounds present in potable water supplies. The subject hose is also useful in other applications such as the transport of household and industrial fluids and the transport of corrosive agents.

The flexible hose of the invention preferably comprises a composite core having a thermoplastic or elastomeric coating surrounding a degradation-resistant, polymeric liner made of a material selected from the group consisting of polyolefins and olefinic fluoropolymers. The coating is preferably made of any of the family of newly developed melt processable thermoplastic olefins (TPO) and like materials such as thermoplastic styrene (TPS), thermoplastic urethane (TPU), thermoplastic rubber (TPR) and thermoplastic elastomers (TPE). According to one particularly preferred embodiment of the invention, the degradation-resistant liner has a convoluted or corrugated inside surface. Flexible thermoplastics such as vinyl or acrylonitrile butadiene styrene (ABS) blends can also be used as an outer coating, with or without reinforcement.

According to another preferred embodiment of the invention, a flexible composite hose is provided that comprises a tubular core with a liner having either annular or spiral convolutions on its inside surface.

According to another preferred embodiment of the invention, a flexible composite hose is provided that comprises a tubular core having a vapor barrier or gas barrier disposed between the liner and liner coating.

According to another preferred embodiment of the invention, a flexible composite hose is provided that comprises a tubular core having a vapor barrier or gas barrier disposed outside the liner coating.

According to another preferred embodiment of the invention, a flexible composite hose is provided that comprises a tubular core having a leak indicator layer disposed between the liner and liner coating.

According to another preferred embodiment of the invention, a flexible hose is provided that comprises a composite core having a thermoplastic elastomeric coating surrounding a degradation-resistant, polymeric liner; a braided sheath surrounding the composite core; and a tracer for indicating twisting of the braided sheath.

According to another preferred embodiment of the invention, a flexible hose is provided that comprises a composite polymeric core, a braided sheath surrounding the composite core, and a polymeric coating surrounding the braided sheath.

According to another preferred embodiment of the invention, a flexible hose is provided that comprises a smooth or convoluted composite polymeric core, and a continuous tubular Mylar® sheath surrounding the composite core.

According to another preferred embodiment of the invention, a flexible hose is provided that comprises a polymeric coating surrounding a continuous tubular Mylar® sheath covering any of the previous embodiments of convoluted or smooth composite cores.

According to another preferred embodiment of the invention, a flexible hose is provided that comprises a monolithic convoluted core having no external coating inside a braided reinforcing sheath or tubular Mylar® sheath, with or without an external polymeric coating.

According to another preferred embodiment of the invention, a flexible hose is provided that comprises a tracer braid in the reinforcing sheath to indicate twisting or identify by color a particular hose type. The tracer braid could be a chemically sensitive dyed material that would indicate exposure of the hose to corrosive agents, or thermally sensitive material that would indicate overheating, or both.

BRIEF DESCRIPTION OF THE DRAWINGS

The apparatus of the invention is further described and explained in relation to the following figures of the drawings wherein:

FIG. 1 is a front elevation view, partially broken away, of a preferred composite hose section of the invention;

FIG. 2 is a cross-sectional elevation view of the tubular core taken along line 2—2 of FIG. 1;

FIG. 3 is a longitudinal cross-sectional view of the tubular core taken along line 3—3 of FIG. 1;

FIG. 4 is a cross-sectional elevation view of the tubular core of a preferred embodiment of the composite hose of the invention having annular convolutions on its inside surface;

FIG. 5 is a longitudinal cross-sectional view of the tubular core of FIG. 4;

FIG. 6 is a longitudinal cross-sectional view of the tubular core of a preferred embodiment of the composite hose of the invention having spiral convolutions on its inside surface;

FIG. 7 is a cross-sectional elevation view of the tubular core of another preferred embodiment of the composite hose of the invention having inside and outside surfaces with spiral convolutions;

FIG. 8 is a longitudinal cross-sectional view of the tubular core of FIG. 7;

FIG. 9 is a longitudinal cross-sectional view of the tubular core of a preferred embodiment of the composite hose of the invention having inside and outside surfaces with annular convolutions;

FIG. 10 is a detail cross-sectional view of the tubular core of a preferred composite hose segment showing a vapor barrier or gas barrier disposed between the liner and liner coating;

FIG. 11 is a detail cross-sectional view of the tubular core of a preferred composite hose segment showing a vapor barrier disposed outside the liner coating; and FIG. 12 is a detail cross-sectional view of the tubular core of a preferred composite hose segment showing a leak indicator layer disposed between the liner and liner coating.

Like reference numerals are used to indicate like parts in all figures of the drawings.

DESCRIPTION OF THE PREFERRED EMBODIMENTS

Referring to FIG. 1, flexible connector hose 10 is typically used for connecting hot and cold potable water supply lines to sanitary appliances such as lavatories, toilets, dishwashing machines, clothes washing machines, hot water heaters and the like. Hoses used for these purposes are usually relatively short in length and have threaded fittings 14 attached to each end of the hose to facilitate connection to the water supply line and to the appliance. It will be apparent upon reading the present disclosure, however, that the hose structures disclosed herein can also be used for transporting fluids other than potable water. Such fluids can include, for example, corrosive liquids, other household and industrial liquids, and gas such as LP gas. Fittings 14 can be made of metal, glass, ceramic, plastic or any other suitable material and can be attached to the hose material by any conventional means that will withstand the temperature and operating pressure for the intended service.

Connector hose 10 preferably comprises hose portion 12 having composite core 16 as described below surrounded by a protective, most preferably braided, sheath 18, which is made of any material suitable for the intended application and operating pressures. Methods for making braided sheath 18 around composite core 16 are well known, and satisfactory materials for braided sheath 18 can include, for example, stainless steel wire, galvanized steel wire, aluminum wire, tin/copper alloys, polyamide fibers such as nylon and Kevlar® (DuPont Co. trademark), textile fibers, polymeric filaments, synthetic threads or other synthetic materials, and the like.

For some uses, particularly in environments that are corrosive to braided sheath 18, hose portion 12 desirably further comprises a substantially continuous coating layer 20 of another polymeric material, preferably an extruded thermoplastic or melt processable elastomeric material through which braided sheath 18 may or may not remain visible. Color or striping may be added to enhance aesthetics of the hose or provide color coding for specific applications. For some applications, composite core 16 can also be coated with a thermosetting polyester resin such as Mylar® (DuPont Co. trademark). Where a coating layer 20 is provided over or in place of braided sheath 18, a means such as tracer 22 can be provided to indicate twisting that may be imparted to braided sheath 18 unintentionally during installation of connector hose 10. Tracer 22 can also be color coded to designate particular transported fluids, can contain a pH sensitive material to indicate exposure to acidic or corrosive substances, or can function as a wear indicator whenever the structural integrity of the hose is compromised.

The preferred structure and materials useful for making the composite core of the hoses of the invention are further described and explained in relation to FIGS. 2 through 12. Referring first to FIGS. 2 and 3, composite core 16 preferably further comprises liner 24 surrounded by liner coating 26 that is either bonded or unbonded. According to one preferred embodiment of the invention, liner 24 and liner coating 26 are coextruded, run through a conventional process where braided sheath 18 is formed around composite core 16, and cut to the desired length prior to the attachment of fittings 14 as previously described in relation to FIG. 1. Liner 24 is desirably extruded from a degradation-resistant polyolefin resin such as polymers and copolymers of ethylene and propylene. As used herein, the term "degradation-resistant" refers to materials that are less subject to degradation or decomposition when subjected to chlorine and compounds such as chloramines frequently found in potable water sources than elastomers and the EPDM rubbers often used as the water-conductive tubular core in conventional, commercially available hose connectors.

Particularly preferred olefinic polymers for use in making liner 24 of composite core 16 include, for example, low density polyethylene, linear low density polyethylene, high density polyethylene, copolymer polypropylene, homopolymer polypropylene, and mixtures thereof. Also preferred for use as materials for making liner 24 of the invention are fluoroplastics and fluoropolymers including, for example, the TEFLON® and TEFZEL® (DuPont Co. trademarks) family of fluoroplastics and fluoropolymers such as TEFLON PTFE (polytetratfluoroethylene), TEFLON FEP (fluorinated ethylene-propylene), TEFLON PFA (perfluoroalkoxy), TEFLON AF and TEFZEL polymers.

Preferred materials for use in forming the coextruded layer identified as liner coating 26 in FIGS. 2 and 3 include thermoplastic elastomers. One particularly preferred thermoplastic elastomer for use in making liner coating 26 of composite core 16 is SANTOPRENE® (Monsanto trademark) rubber, made from polypropylene and ethylene propylene diamine (EPDM) rubber. One particularly preferred composite core 16 for use in connector hose 10 comprises a liner 24 made of low density polyethylene (LDPE) or linear low density polyethylene (LLDPE) surrounded on its outside surface by a coextruded liner coating 26 made of SANTOPRENE® rubber. Other melt processable materials may be substituted such as TPV, TPS, TPE, TPO, vinyl, ABS polymer, and other variations and blends not listed.

According to another preferred embodiment of the invention, as described in relation to FIGS. 4–6, composite core 28, while still having a generally tubular configuration, can have a corrugated or convoluted inside surface. This structure can be used, for example, to improve hose flexibility, to avoid pinching off the flow channel during flexing, and to provide frictional resistance to slippage where there is little or no bonding between the liner and liner coating. This composite core structure is particularly desirable where the liner is made of a material such as the TEFLON® and TEFZEL® materials discussed above. Where a convoluted surface is utilized inside the core, a braided sheath, outside coating and fittings as previously described can still be employed as desired in making the hoses of the invention.

Referring to FIGS. 4 and 5, composite core 28 comprises liner 30 and liner coating 32. As depicted in these figures, inwardly facing surface 31 of liner coating 32 follows the convolutions of liner 30 while outwardly facing surface 33 of liner 32 is substantially cylindrical. One preferred composite core 28 comprises a liner 30 made of a polyolefin or a fluoroplastic or fluoropolymer as previously disclosed surrounded on its outside surface by a coextruded liner coating 22 made of a melt processable thermoplastic elastomer such as SANTOPRENE® rubber. The convolutions on the inside surface of the composite core can be annular convolutions 34 as shown in FIG. 5 for composite core 28, or spiral convolutions 42 as shown in FIG. 6 where convoluted liner 38 is disposed inside liner coating 40 of composite core 36.

According to one particularly preferred embodiment of the invention, as shown in FIGS. 7–9, where the liner 44 is convoluted and made of either polyolefin or a fluoroplastic or fluoropolymer, a liner coating may not be required where wall thicknesses are sufficient to provide the desired strength. FIG. 8 depicts an embodiment where convolutions 46 of liner 44 are spirally arranged, and FIG. 9 depicts an embodiment where convolutions 50 of liner 48, otherwise made like liner 44 of FIG. 8, are annularly arranged.

Referring to FIGS. 10 and 11, connector hose 10 of the invention can be adapted if desired to include a gas or vapor barrier either by incorporating such barrier 56 between liner 52 and liner coating 54 (FIG. 10) or by placing barrier 62 outside liner coating 60 over liner 58 (FIG. 11). Such a barrier might be utilized to prevent oxidation of the transported fluid, avoid corrosion of the braided sheath, prevent the release of hazardous volatiles, or the like. Satisfactory barrier materials can include, for example, metallic foils such a aluminum foil or commercially available polymeric films that are substantially impermeable to the transmission of gas or such other volatiles as may be desired to be contained within the composite core. Depending upon the materials used for the barrier material and for the liner and liner coating components, one or more compatible adhesive layers not shown in FIGS. 10 and 11 may also be desired.

Another preferred embodiment of the invention is described in relation to FIG. 12, which discloses for purposes of illustration and example, a leak indicator 68 disposed between liner 64 and liner coating 66. Leak indicator 68 is desirably provided to facilitate detection of liner failure or fluid leakage through the hose, and can be incorporated into the structure of the connector hose of the invention in any of several forms. According to one preferred embodiment of the invention, a foamed polymeric layer is applied between liner 64 and liner coating 66 that comprises voids containing a liquid or powdered dye which is picked up by the transported liquid whenever liner 64 is cracked or otherwise damaged. According to another embodiment of the invention, a powdered dye is applied directly to the outer surface of liner 64 prior to extruding liner coating 66.

Although a preferred embodiment of the hose of the invention is described herein as having a composite core formed by coextrusion, it will be appreciated by those of ordinary skill in the art upon reading this disclosure that other known methods can also be used for applying additional layers to the hose liner. Connector hoses having the structures and utilizing the materials disclosed herein can also be molded in place if desired. Other alterations and modifications to the preferred embodiments of the invention as herein disclosed will likewise become apparent to those of ordinary skill in the art upon reading this disclosure, and it is intended that the scope of the invention be limited only by the broadest interpretation of the appended claims to which the inventors are legally entitled.

We claim:

1. A flexible connector hose comprising a composite tubular core consisting essentially of an extruded tubular liner made of linear low density polyethylene surrounded by a coextruded, contacting tubular liner coating made of a thermoplastic elastomer.

2. The hose of claim 1 wherein the elastomer is made of propylene and EPDM rubber.

3. The hose of claim 1 wherein the liner has a continuously convoluted inside surface.

4. The hose of claim 3 wherein the inside surface of the liner has annular convolutions.

5. The hose of claim 3 wherein the inside surface of the liner has spiral convolutions.

6. The hose of claim 1 further comprising a vapor or gas barrier material disposed outwardly of said liner and adjacent to said liner coating.

7. The hose of claim 1 further comprising a leak indicator.

8. The hose of claim 7 wherein the leak indicator is a dye-filled, foamed polymeric layer disposed between the liner and liner coating.

9. The hose of claim 7 wherein the leak indicator is powder disposed between the liner and liner coating.

10. The hose of claim 1 wherein the composite tubular core is surrounded by a protective sheath.

11. The hose of claim 10 wherein the protective sheath is made of a material selected from the group consisting of braided stainless steel wire, galvanized steel wire, aluminum wire, tin/copper alloy wire, polyamide fibers, textile fibers and synthetic threads.

12. The hose of claim 10 wherein the protective sheath is covered by a polymeric coating layer.

13. The hose of claim 10, further comprising a twist indicator for the protective sheath.

14. The hose of claim 1 wherein the composite tubular core is surrounded by a thermosetting polyester resin.

15. The hose of claim 11, further comprising a flexible coating overlying the sheath that is made of a melt processable thermoplastic material.

16. A connector hose assembly comprising a tubular core consisting essentially of a polyolefinic liner made of a material selected from the group consisting of low density polyethylene, linear low density polyethylene, high density polyethylene, copolymer polypropylene, homopolymer polypropylene, and mixtures thereof, a braided protective sheath surrounding the core; further comprising an extruded tubular liner coating made of a thermoplastic elastomer, the liner coating being disposed between the polyolefinic liner and the protective sheath, and at least one end fitting connected to the protective sheath.

17. The hose assembly of claim 16 wherein the core is continuously convoluted.

18. The hose assembly of claim 16 further comprising a polymeric outer coating surrounding the protective sheath.

19. The hose assembly of claim 16 wherein the protective sheath is made of braided metal wire.

20. The hose assembly of claim 16 wherein the protective sheath is made of polyamide fibers.

21. The hose assembly of claim 16, further comprising a twist indicator.

22. The hose assembly of claim 16, further comprising a leak indicator.

23. The hose assembly of claim 16, further comprising a barrier substantially impermeable to volatile materials that is disposed between the convoluted core and the protective sheath.

24. The hose of claim 14, further comprising a flexible coating overlying the sheath that is made of a melt processable thermoplastic material.

25. The hose of claim 1 comprising first and second ends, in combination with a connector fitting attached to at least one of said first and second ends.

26. The hose of claim 1 wherein the composite tubular core is surrounded by a braided metallic sheath.

* * * * *